United States Patent [19]
Hatozaki et al.

[11] Patent Number: 6,110,089
[45] Date of Patent: *Aug. 29, 2000

[54] BAG MAKING AND PACKAGING MACHINE

[75] Inventors: Hirokazu Hatozaki; Setsuo Haze, both of Shiga, Japan

[73] Assignee: Ishida Co., Ltd., Kyoto, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/928,180

[22] Filed: Sep. 12, 1997

[30] Foreign Application Priority Data

Sep. 14, 1996 [JP] Japan .................................. 8-265236

[51] Int. Cl.⁷ ...................................................... B31B 1/64
[52] U.S. Cl. ........................... 493/189; 493/193; 493/197; 53/551; 53/373.7; 53/375.9
[58] Field of Search ..................................... 493/189, 193, 493/196, 197, 205, 208; 53/550, 551, 373.7, 374.3, 374.5, 374.4, 375.4, 376.2

[56] References Cited

U.S. PATENT DOCUMENTS

| | | |
|---|---|---|
| 3,986,921 | 10/1976 | Putman, Jr. et al. . |
| 5,191,750 | 3/1993 | Kammler .............................. 53/374.5 |
| 5,357,731 | 10/1994 | Conway et al. ....................... 53/374.4 |
| 5,669,201 | 9/1997 | Simionato ............................. 53/374.5 |
| 5,787,690 | 8/1998 | Konno .................................... 53/550 |

FOREIGN PATENT DOCUMENTS

| | | |
|---|---|---|
| 0226693 | 4/1986 | European Pat. Off. . |
| 0368016 | 10/1989 | European Pat. Off. . |
| 0469819 | 7/1991 | European Pat. Off. . |
| 0560988 | 10/1992 | European Pat. Off. . |
| 3919642 | 12/1990 | Germany . |

*Primary Examiner*—Eugene Kim
*Attorney, Agent, or Firm*—Majestic, Parson, Siebert & Hsue P.C.

[57] ABSTRACT

A bag making and packaging machine has a pair of transverse sealing members on opposite sides of a film path for transversely sealing a bag-making film moving longitudinally along this path. A pair of support members supports these transverse sealing members and is driven so as to bring the transverse sealing members towards each other to contact with the film and away to separate them from each other. At least one elastic member is interposed between at least one of the support members and the corresponding one of the transverse sealing members. This elastic member is in a contracted condition when the transverse sealing members are in contact with the film on the film path and thereby applying on the film a sealing pressure corresponding to the distance by which the elastic member is contracted. A target sealing pressure appropriate for the kind of film being used is set, and a control unit adjusts at least either the distance of movement by the support members or the minimum separation between them such that the sealing pressure on the film becomes equal to the selected target sealing pressure.

12 Claims, 6 Drawing Sheets

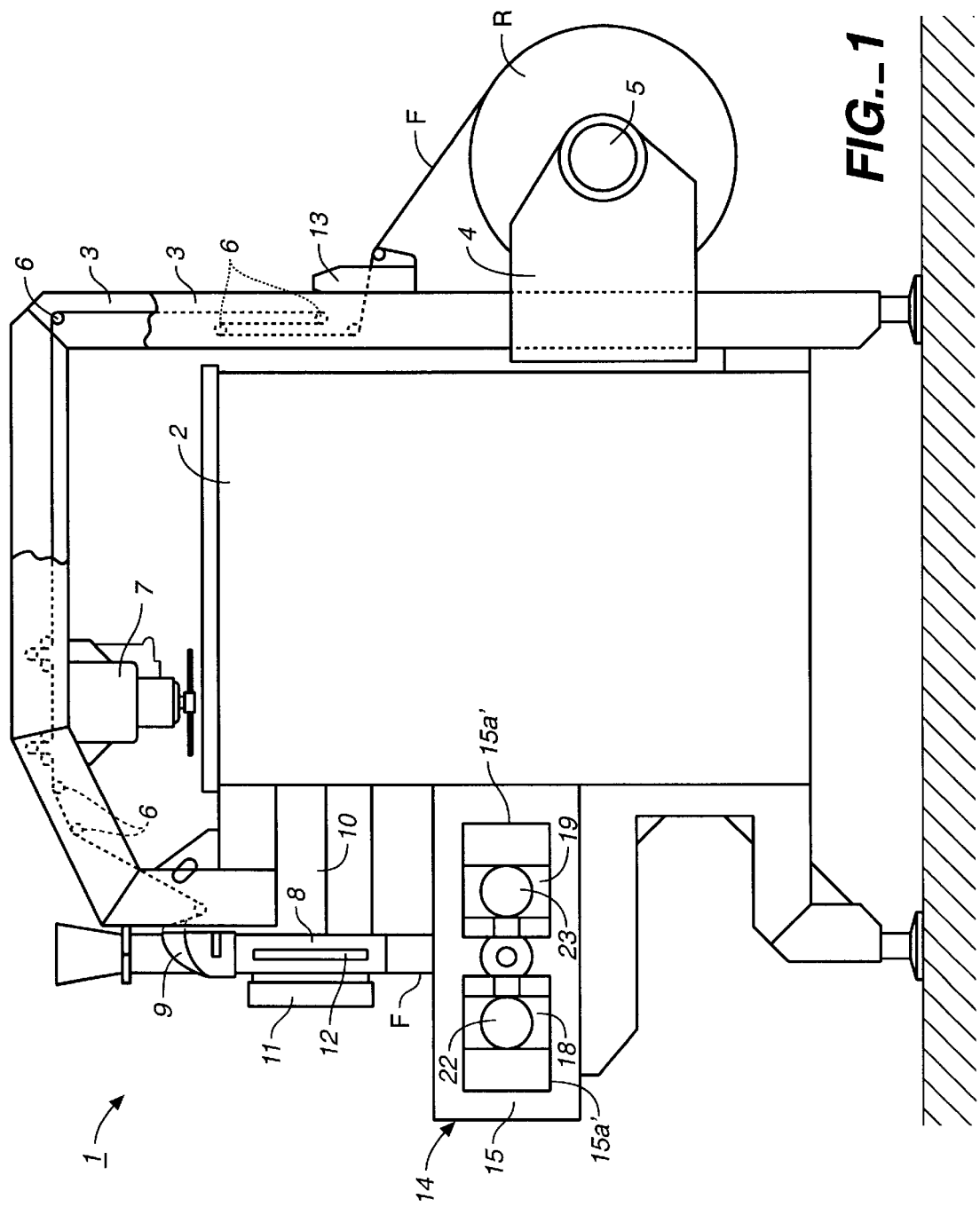

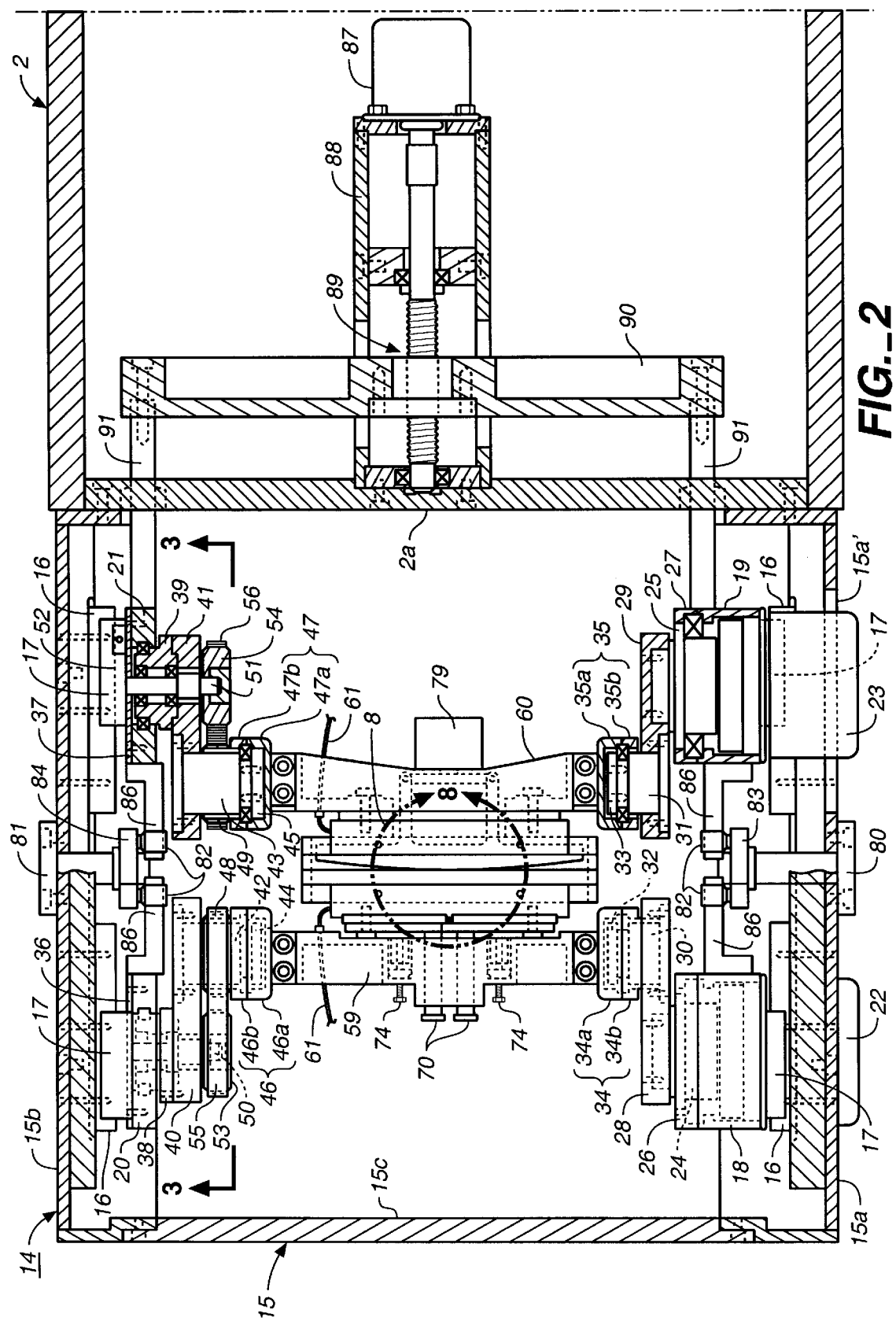
FIG._2

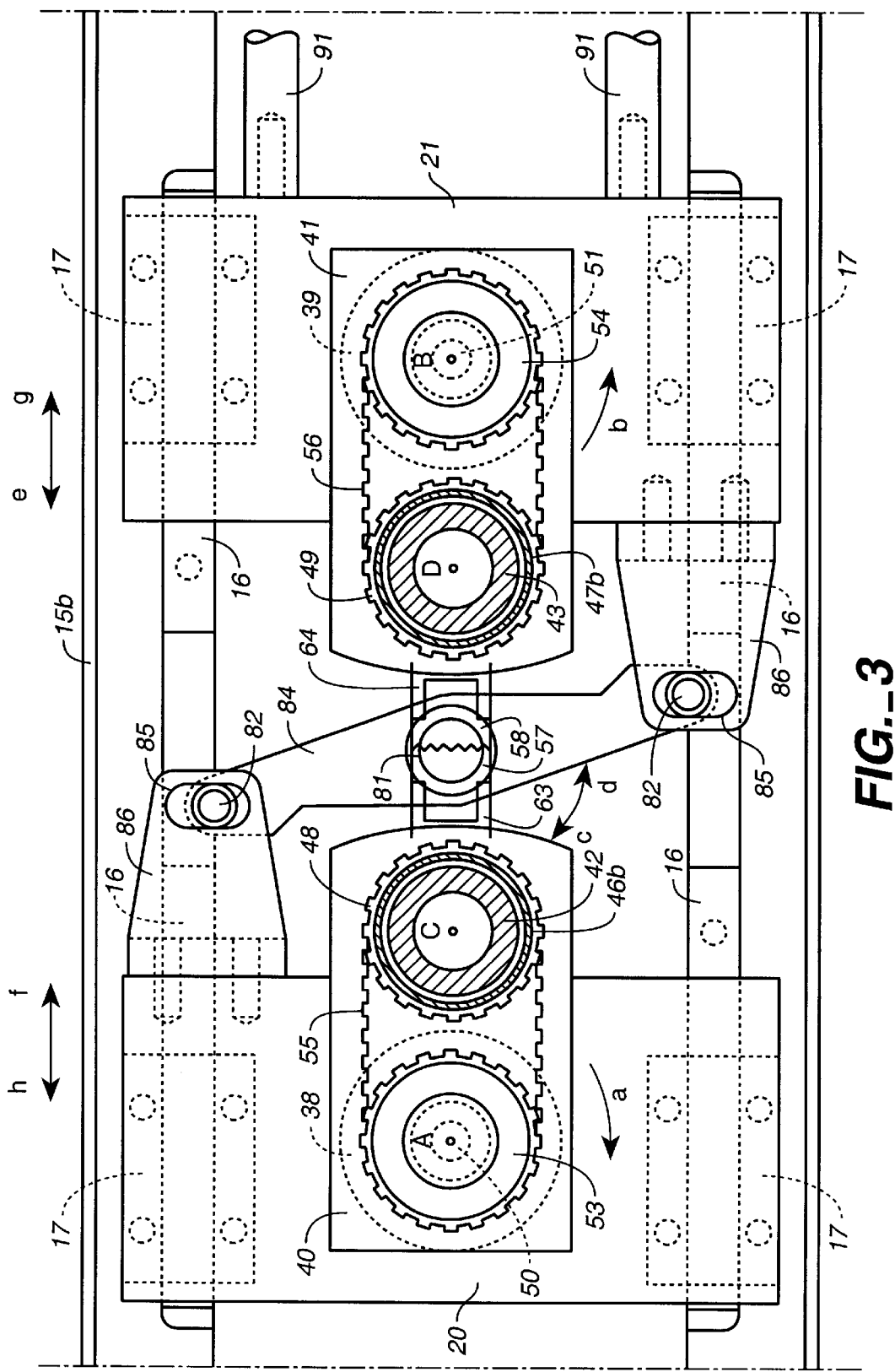
FIG._3

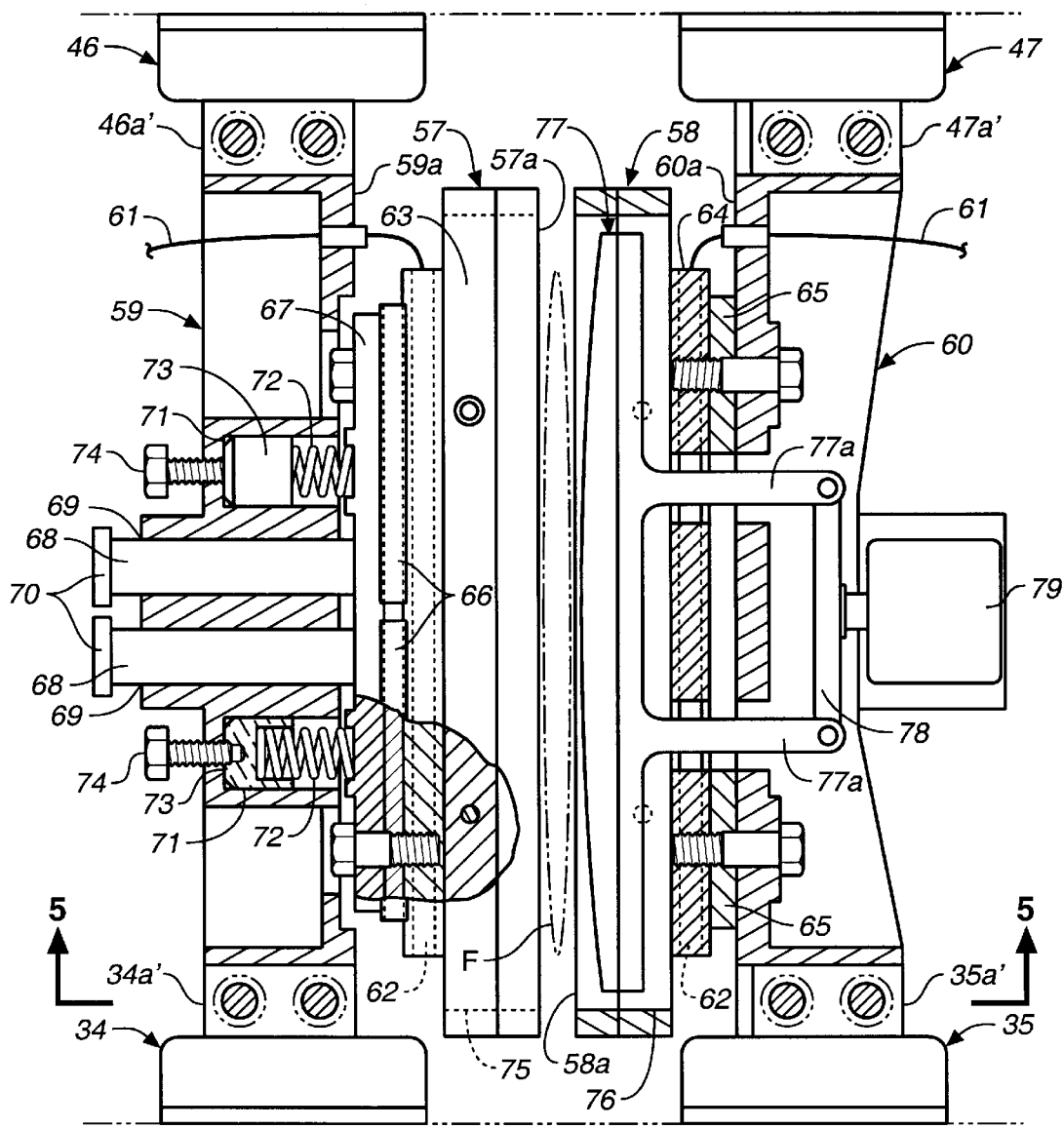
FIG._4
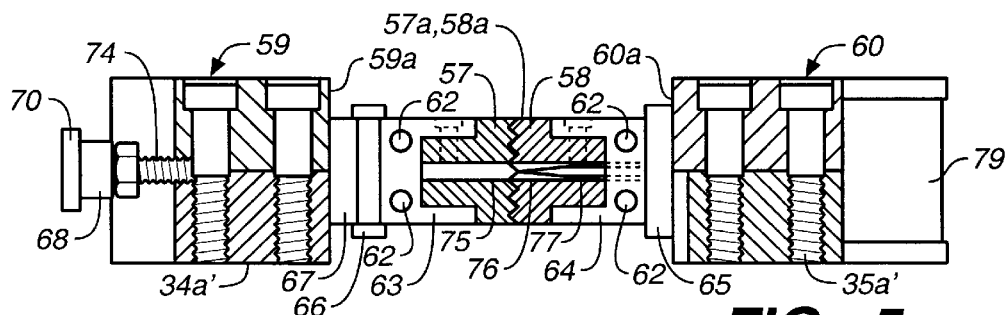
FIG._5

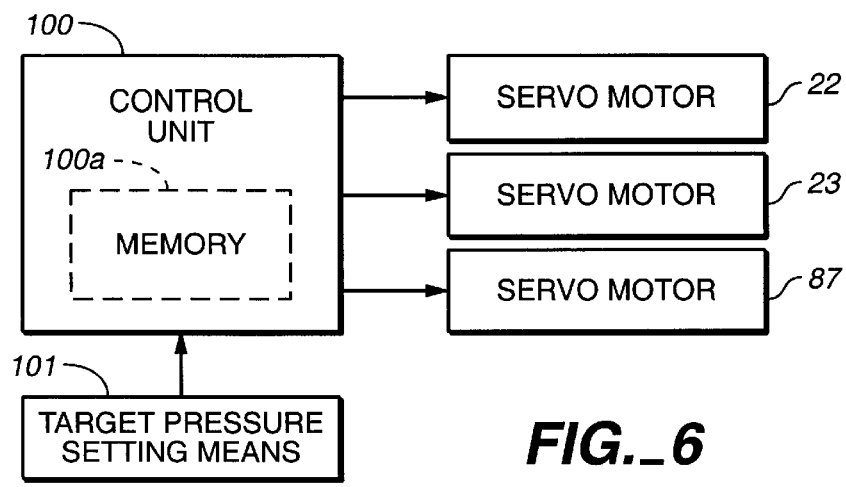
FIG._6
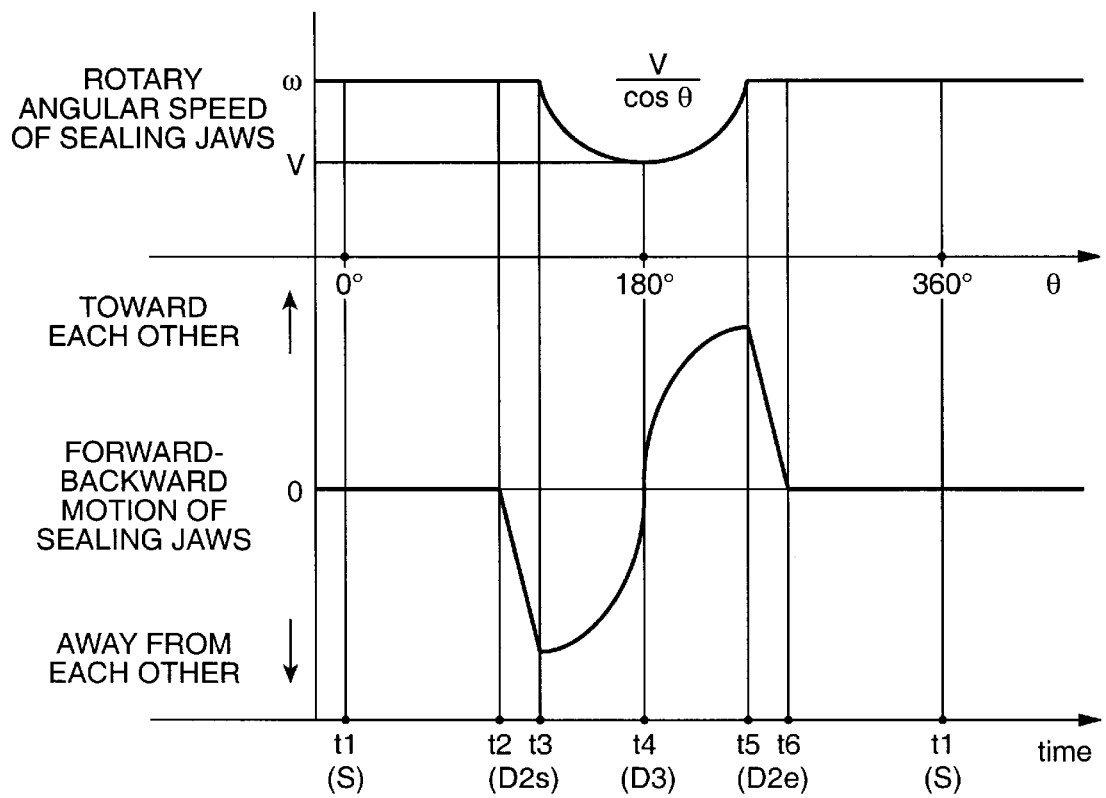
FIG._7

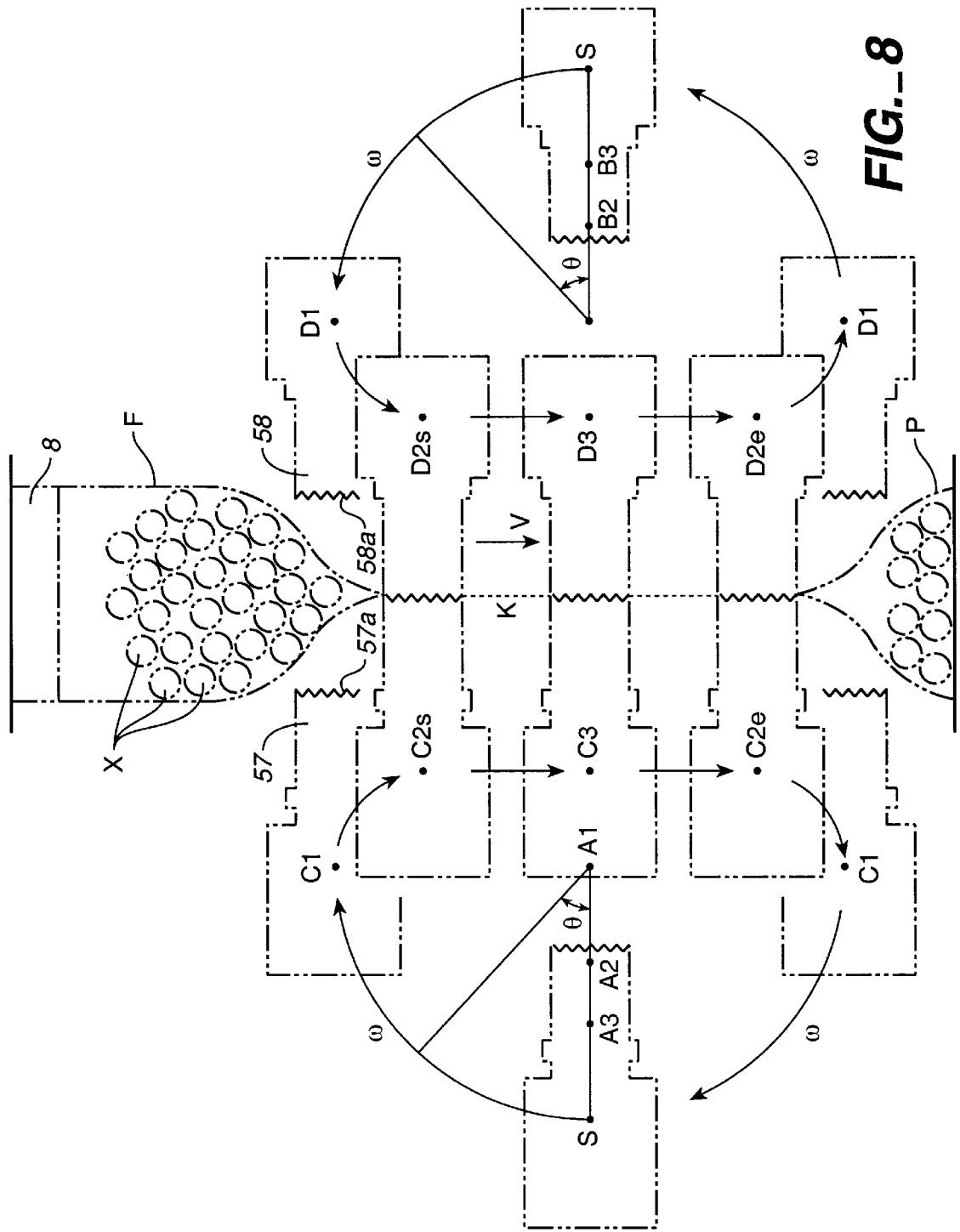
FIG._8

BAG MAKING AND PACKAGING MACHINE

BACKGROUND OF THE INVENTION

This invention relates to a bag making and packaging machine for making packages while making bags from an elongated web of a film material and more particularly to such a machine with an improved pressure control for the transverse sealing.

As disclosed in Japanese Patent Publication Tokkai 3-1362, there have been known bag making and packaging machines of the type adapted to pull out an elongated film from a roll, to transport it along a specified path while bending it into a cylindrical form at a downstream position along the path, to seal together its mutually overlapping side edges, to form it into the shape of a bag with the bottom edge transversely sealed between a pair of sealing jaws, to supply articles to be packaged into this bag, to thereafter similarly seal the upper edge transversely and to cut the film to separate the bag, thereby sequentially producing bags with articles sealed therein. With a machine of this type, the transverse sealing of the tubularly formed film is generally effected by means of a pair of sealing jaws disposed opposite to each other across the path of the film and adapted to be brought into contact with the film to thereby heat and seal the tubularly formed film. If the sealing jaws are adapted to move linearly in a reciprocating manner, however, the sealing of the film can be effected only at one point where the jaws come into contact, and the film must be stopped on its path of transportation for a sufficient length of time required for the sealing. Japanese Utility Model Publication Jikko 59-16242 disclosed a system whereby the sealing jaws are each biased by means of a spring in the direction towards the other and are cause to undergo rotary motion in mutually opposite directions including mutually parallel parts such that while the sealing jaws are on these mutually parallel parts of their trajectories, they contact each other against the forces of the springs. Since each jaw moves along a generally D-shaped trajectory, the time of sealing can be made longer while the film continues to move.

Recently, however, use of biodegradable and photodissociable materials is seriously proposed for producing packaging bags for the purpose of protecting the earth's environment. Films of this and other kinds are usually thinner than the film materials which were commonly used in the past. Thus, although prior art films could be sealed at a pressure of several hundred kilograms and it was not necessary to accurately control the sealing pressure, a more precise control is becoming necessary when a film of a more recently developed thinner material is used.

With most of the prior art bag making and packaging machines, however, the sealing pressure was fixed and could not be adjusted according to the kind of film to be used. In the case of a system according to aforementioned Japanese Utility Model Publication Jikko 59-16241, for example, the sealing pressure changes in a fixed manner, being weak during the beginning and final portions of each contacting period of the jaws moving in D-shaped trajectories and stronger in the middle portion. A fine control of the sealing pressure, such as increasing or decreasing it according to the kind of the film or keeping it constant while the jaws are in contact with each other, was beyond its capacity.

Japanese Patent Publication Tokkai 61-190422, on the other hand, disclosed the technology of adjusting the sealing pressure of sealing jaws to a specified target level by controlling a fluid pressure such as air pressure or oil pressure, while Japanese Patent Publication Tokko 8-25542 disclosed a similar technology by controlling the torque of a servo motor. Pressure adjustment by means of a fluid or a servo motor is difficult from the point of view of responsiveness, however, and fine and delicate adjustments and controls are difficult to carry out. The pressure across the sealing surface, furthermore, can be ascertained only by actually measuring it.

SUMMARY OF THE INVENTION

It is therefore an object of this invention to provide an improved bag making and packaging machine capable of a fine control of the sealing pressure with good responsiveness even if a thin film such as films of a recently developed biodegradable material is being used.

A bag making and packaging machine embodying this invention, with which the above and other objects can be accomplished, may be characterized not only as comprising a pair of transverse sealing members on opposite sides of a film path for transversely sealing a bag-making film, a pair of support members each supporting a corresponding one of these transverse sealing members, driving means for moving these support members to bring the transverse sealing members towards each other to contact with the film and away to separate them from each other, but also wherein at least one elastic member is interposed between at least one of the support members and the corresponding transverse sealing member. This elastic member is in a contracted condition when the transverse sealing members are in contact with the film on the film path, thereby applying on the film a sealing pressure corresponding to the distance by which the elastic member is contracted. A target setting means is provided for allowing the user to set a target sealing pressure and a control unit adjusts at least either the distance of movement by the support members or the minimum separation between the support members when the film is being transversely sealed, controlling the driving means such that the sealing pressure on the film approaches and becomes equal to the target sealing pressure which has been set.

With a bag making and packaging machine thus structured, the distance by which the elastic member such as a return spring is contracted can be adjusted by controlling either the distance by which the support members are moved in order to sandwich the film between the transverse sealing members or the minimum separation between the pair of support members. Since the transverse sealing pressure on the film is controlled and determined by this distance of contraction, the transverse sealing pressure can be adjusted by controlling the driving mechanism for the support members. Since the relationship between the distance by which the elastic member is contracted and the transverse sealing pressure is known, derived from the elastic constant of the elastic member, the distance to be traveled by the support members and the minimum separation therebetween at the time of a transverse sealing can be preliminarily calculated. Thus, a desired transverse sealing pressure can be realized without actually measuring the pressure and carrying out a feedback control.

Each of the transverse sealing members moves around on a closed path including a straight portion which is parallel to and along the film path such that the two transverse sealing members will remain next to each other when moving on this straight portion. Thus, the transverse sealing is carried out while the transverse sealing members are moving along the film and keep applying a constant pressure on the film.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a schematic side view of a bag making and packaging machine embodying this invention;

FIG. 2 is a sectional plan view of the transverse sealer of the machine of FIG. 1;

FIG. 3 is a view taken along line 3—3 of FIG. 2;

FIG. 4 is a sectional plan view of the sealing jaws and support members of the transverse sealer of FIG. 2;

FIG. 5 is a view taken along line 5—5 of FIG. 4;

FIG. 6 is a block diagram of the control system for the transverse sealer of FIG. 2;

FIG. 7 is a time chart for the operation of the sealing jaws; and

FIG. 8 is a schematic side view of the machine for illustrating its operation.

DETAILED DESCRIPTION OF THE INVENTION

FIG. 1 shows a bag making and packaging machine 1 embodying this invention of the type adapted to transport a film F in a continuous motion, comprising a pair of left-hand side and right-hand side frames 3 extending upward from the back of the main body 2 to reach the front part, a roll R for the film F rotatably supported behind the frames 3 by a support bracket 4 and a drive shaft 5 such that the film F pulled out of the roll R is transported along the frames 3 to the front part of the main body 2, guided by a plurality of guide rollers 6 set between the frames 3 while a printer 7 disposed at an upper part of the frames 3 serves to make prints on the film such as the production date.

Provided at the front portion of the frames 3 are a vertically extending cylindrical chute 8 for passing therethrough articles to be packaged and a former 9 having a specified shape, disposed around the chute 8 such that the elongated film F guided along the frames 3 is bent into a cylindrical tubular shape with its side edges overlapped on the peripheral surface of the chute 8 and is transported further downward along the chute 8 while remaining in this cylindrical form.

In front of the cylindrical chute 8 is a longitudinal sealer 11 facing the chute 8 and supported by an L-shaped support arm 10 extending forward from the main body 2 so as to surround the chute 8 such that the mutually overlapped side edge portions of the cylindrically formed film F are pressed against the chute 8 and thermally bonded together.

On both sides of the cylindrical chute 8 are a pair of pull-down belts 12 (although only one of them is visible in FIG. 1) for continuously pulling down the cylindrically formed film F by adsorption. The film F pulled out of the film roll R and the cylindrically formed portion of the film F are pulled longitudinally along the film path by the continuous movement of the pull-down belts 12 and the rotation of the aforementioned drive shaft 5 supporting the film roll 6 such that no excessive tensile force will be imparted. Numeral 13 indicates a splicer disposed above the film roll R for connecting together a new film with an old one when a new film roll is installed to the machine.

Below the cylindrical chute 8 is a transverse sealer 14 for transversely sealing the cylindrically formed film F hanging downward from the chute 8. The transverse sealer 14 contains therein a cutter for separating a leading portion of the film F from a following portion at the center of the sealed portion of the film. The transverse sealer 14 has a pair of sealing jaws for compressing and heating the cylindrically formed film F therebetween, adapted to move downward while sandwiching the film F therebetween in the transverse direction such that the film can be transversely sealed without stopping the continuous motion of the film F being pulled out of the film roll R. After this cylindrically formed film F is transversely sealed, articles X to be packaged are dropped through the chute 8, as sketched in FIG. 8. As the film F is continuously transported downward and the dropped articles fill the bag thus formed, transverse sealing is effected at a position above the dropped articles and the film is cut. The bag P thus formed is discharged, as shown in FIG. 8, and this sequence is repeated.

The mechanical structure of the transverse sealer 14 is explained next more in detail with reference to FIGS. 2 through 5. As shown in FIG. 2, the transverse sealer 14 has a frame 15 which includes a pair of guide plates 15a and 15b extending forward from the main body 2 and a front plate 15c which connects the front end parts of the guide plates 15a and 15b such that the sealing and cutting of the film F hanging from the chute 8 are effected inside the space surround by the frame 15 in front of the main body 2.

At four positions, at upper and lower parts inside the guide plates 15a and 15b and in front and at the back, there are rails 16 extending horizontally in the direction of the guide plates 15a and 15b. Four slide bases 18, 19, 20 and 21 are slidably set to these rails 16 through linear bearings 17.

Two servo motors 22 and 23 are supported respectively by the forward and backward slide bases 18 and 19 attached to the left-hand side guide plate 15a at about the half-way along in the vertical direction. Shafts 24 and 25 connected to the drive shafts of these servo motors 22 and 23, respectively, are rotatably supported by, and protrude inward from, bearing members 26 and 27 clamped to the inner surfaces of these slide bases 18 and 19. Elongated arm members 28 and 29 are respectively at these protruding parts of the shafts 24 and 25 so as to rotate around the shafts 24 and 25 by the operation of the servo motors 22 and 23. As shown in FIG. 1, the left-hand side guide plate 15a is provided with throughholes 15a' through which the servo motors 22 and 23 are allowed to pass without interfering the sliding motion of the slide bases 18 and 19 in the forward-backward direction.

Shaft members 30 and 31 are fitted to the free-moving ends of the arm members 28 and 29, protruding inward therefrom. These protrusions are provided with stopper plates 32 and 33 for preventing disengagement, and bearing members 34a, 34b, 35a and 35b are set so as to cover the protruding end parts, thereby forming rotors 34 and 35 which are rotatable relative to the arm members 28 and 29. As shown in FIGS. 4 and 5, attachment flanges 34a' and 35a' for affixing sealing jaw supporting blocks 59 and 60 (to be described below) are formed on the inner surfaces of the bearing members 34a and 35a forming these rotors 34 and 35.

Follower shafts 38 and 39 are rotatably supported at vertically middle positions of the forward and backward slide bases 20 and 21 attached to the right-hand side guide plate 15b by means of bearing members 36 and 37 clamped to the outer surfaces of the slide bases 20 and 21. These follower shafts 38 and 39 protrude inward from these slide bases 20 and 21. Elongated arm members 40 and 41 are provided at these protruding end parts so as to rotate around these shafts 38 and 38 integrally therewith.

Shaft members 42 and 43 are fitted respectively to the free-moving ends of the right-hand side arm members 40 and 41, protruding inward therefrom. These protrusions are provided respectively with stopper plates 44 and 45 for preventing disengagement, and bearing members 46a, 46b, 47a and 47b are set so as to cover the protruding end parts, thereby forming right-hand side rotors 46 and 47 which are rotatable relative to the arm members 40 and 41. As shown in FIG. 4, attachment flanges 46a' and 47a' for affixing the sealing jaw supporting blocks 59 and 60 at the opposite end parts are formed on the inner surfaces of the inner bearing members 46a and 47a forming these right-hand side rotors 46 and 47. Toothed pulleys 48 and 49 are integrally formed to the outer bearing members 46b and 47b of the right-hand side motors 46 and 47.

Provided on the axis of rotation of the right-hand side arm members 40 and 41, there are shaft members 50 and 51 which pass through holes formed respectively through the aforementioned bearing members 36 and 37 clamped to the outer surfaces of the slide bases 20 and 21, the follower shafts 38 and 39, and the arm members 40 and 41. Outer end parts of these shaft members 50 and 51 protrude from the bearing members 36 and 37. The shaft members 50 and 51 are prevented from rotating by means of penetrating rigid pins 52 attached individually to the bearing members 36 and 37, and serve as axes of rotation for the follower shafts 38 and 39 and the arm members 40 and 41. The inner end parts of the shaft members 50 and 51 protrude from the arm members 40 and 41. Toothed pulleys 53 and 54, which have the same number of teeth as, and form pairs with, the aforementioned toothed pulleys 48 and 49, are affixed to the inner ends of the shaft members 50 and 51. Timing belts 55 and 56 are stretched respectively between the pulleys 48 and 53 and between the pulleys 49 and 54.

The support blocks 59 and 60 for supporting sealing jaws 57 and 58 are disposed respectively between the forwardly positioned arm members 28 and 40 and between the backwardly positioned arm members 29 and 41 through the aforementioned flanges 34a', 35a', 46a' and 47a' respectively of the rotors 34, 35, 46 and 47, so as to sandwich the downward path K, as shown in FIG. 8, of the cylindrically formed film F hanging from the cylindrical chute 8. As the servo motors 22 and 23 are activated, these forwardly and backwardly positioned support blocks 59 and 60 rotate around the shafts 24 and 38 (point A) and shafts 25 and 39 (point B) in front of and behind the film F on the path K.

Both sealing jaws 57 and 58 are made of a metallic material with a high heat conductivity. As shown in FIGS. 4 and 5, they are attached respectively to base members 63 and 64 through which heaters 62 are inserted longitudinally. Currents are passed to these heaters through lead lines 61. At the back, the base member 64 is directly attached to a support surface 60a of the support block 60 through thermally insulative members 65. In front, a patch plate 67 is attached to the base member 63 through thermally insulative members 66. Protruding shaft parts 68 of this patch plate 67 are inserted into throughholes 69 formed in the forwardly positioned support block 59 such that the base member 63 is supported and slidable in the forward-backward direction on the support surface 59a of this support block 59.

Stopper plates 70 for preventing the base member 63 from slipping off backward are attached to the front ends of the shaft parts 68. Indentations 71 are formed on both sides of the throughholes 69 of the support block 59, and return springs 72 are contained in these indentations 71, applying their biasing forces through the patch plate 67 on the forward base member 63 in the backward direction, that is, towards the backward sealing jaw 58. Thus, when the sealing jaws 57 and 58 face each other, the forward base member 63 or the forward sealing jaw 57 is pressed in the direction of the support block 59 against the biasing force of the return springs 72, thereby compressing the return springs 72. A reaction force corresponding to this contraction is applied from the return springs 72 to the sealing jaw 57, providing the clamping pressure or the transverse sealing pressure between the sealing jaws 57 and 58.

The return springs 72 are received inside the indentations 71 by means of receiving members 73, which are adapted to move in the forward-backward direction inside the indentations 71 as screws 74 provided on the front surface of the forward support block 59 are turned. In summary, biasing force of the return springs 72 acting on the forward base member 63 can be adjusted by rotating these screws 74 (which are also later referred to as "the initial pressure setting means"). For example, the receiving members 73 may be initially moved forward to preliminarily set the return springs 72 in a contracted condition. In this way, even if they contract by the same distance by the mutual contact of the sealing jaws 57 and 58, a greater transverse sealing pressure can be obtained, and fine adjustments of the transverse sealing pressure on the film can be easily effected.

Projecting end surfaces 57a and 58a of the sealing jaws 57 and 58 are provided with a large number of grooves for mutual engagement and serve as contact surfaces for sandwiching the cylindrically formed film F therebetween. Longitudinally elongated slits 75 and 76 are provided to these contact surfaces 57a and 58a at middle positions in the vertical direction. The slit 76 on the backward sealing jaw 58 contains therein a cutter 77 for cutting the cylindrically formed film F in the transverse direction. The cutter 77 has extended portions 77a extended in the backward direction through holes formed in the base member 64 and the support block 60. As a connecting member 78 connecting these extended portions 77a is moved forward and backward by a driving device 79 such as an air cylinder, the cutter 77 comes out of the slit 76 on the backward sealing jaw 58 towards the slit 75 on the forward sealing jaw 57.

As shown by arrows a and b in FIG. 3, the servo motors 22 and 23 cause the sealing jaws 57 and 58 to rotate in mutually opposite directions such that the sealing jaws 57 and 58 will move downward in the same direction as the motion of the cylindrically formed film F when the sealing jaws 57 and 58 have approached the travel path K of the film. The support blocks 59 and 60 are disposed such that their support surfaces 59a and 60a, and hence the end surfaces 57a and 58a of the sealing jaws 57 and 58, are mutually in a face-to-face relationship, sandwiching the film path K therebetween. This mutually opposite relationship of the sealing jaws 57 and 58 is maintained independently of the rotary motion of the arm members 28, 29, 40 and 41 because the toothed pulleys 48 and 49 on the right-hand side rotors 46 and 47 are linked to the stationary pulleys 53 and 54 on the shaft members 50 and 51 through the timing belts 53 and 54.

As shown in FIGS. 2 and 3, the right-hand side and left-hand side guide plates 15a and 15b are provided respectively with shaft members 80 and 81 at middle positions in the forward-backward and upward-downward directions approximately corresponding to the film path K, and a pair of right-hand side and left-hand side crank members 83 and 84, each having cam followers 82 at both ends, is rotatably attached respectively to these shaft members 80 and 81. The slide bases 18, 19, 20 and 21 are provided with brackets 86 having elongated holes 85 into which the cam followers 82 fit. The left-hand side slide bases 18 and 19 are connected together and the right-hand side slide bases 20 and 21 are connected respectively by the crank members 83 and 84.

A third servo motor 87 is supported inside the main body 2 through a frame 88, as shown in FIG. 2. A ball screw 89 is provided on its rotary shaft, and a beam member 90 which extends horizontally in the direction of its width is attached to the ball screw 89. A pair of upper and lower columnar members 91 is provided, extending forward from both end parts of the beam member 90. The front end parts of these columnar members 91 penetrate a front wall surface 2a of the main body 2 and are connected to the backward slide bases 19 and 21.

Thus, if the aforementioned third servo motor 87 is activated, the backward slide bases 19 and 21 move in the forward-backward direction through the ball screws 89, the beam member 90 and the columnar members 91. As shown in FIG. 3, when the crank members 83 and 84 rotate in the direction of arrow c (or d) and the backward slide bases 19 and 21 move forward (or backward) as shown by arrow e (or g), the forward slide bases 18 and 20 move backward (or forward) as shown by arrow f (or h) such that the forward and backward sealing jaws 57 and 58 move towards (or away from) each other on opposite sides of the film path K.

In summary, not only does the pair of sealing jaws 57 and 58 placed opposite each other across the film path K rotate around point A (or the shafts 24, 38 and 50) and point B (or shafts 25, 39 and 51) respectively by the operations of the servo motors 22 and 23 for rotary motion but also their centers of rotation A and B are caused to move towards and away from each other by the operation of the third servo motor 87.

As shown in FIG. 6, the transverse sealer 14 is provided with a control unit 100 having a memory section 100a. Optimum pressure values for effecting transverse sealing on different kinds of films with different characteristics are stored in this memory section 100a, and the control unit 100 serves to control the servo motors 22, 23 and 87 such that the optimum pressure of each designated film can be realized.

The control of the pressure for transverse sealing effected by the control unit 100 will be explained next with reference to the time chart of FIG. 7 and the conceptual diagram of FIG. 8 which shows the motion of the sealing jaws schematically. Since the sealing jaws 57 and 58 move as a pair in a mirror-symmetric manner with respect to the film path K, only the motion of the backward sealing jaw 58 is shown in the time chart of FIG. 7.

It will be assumed that the center C of the shaft members 30 and 42 at the free-moving ends of the arm members 28 and 40 on which the forward sealing jaw 57 is supported (or the center of the forward sealing jaw 57 as shown in FIG. 3) and the center D of the shaft members 31 and 43 at the free-moving ends of the arm members 29 and 41 (or the center of the backward sealing jaw 58 as shown in FIG. 3) are initially (at time t1) at their farthest positions S from the film path K. At this moment, as shown in FIG. 8, the centers of rotation A and B of the sealing jaws 57 and 58 are at relatively backward and forward positions A1 and B1, respectively, such that the distance therebetween is relatively small. Both sealing jaws 57 and 58 are controlled to rotate at a constant angular speed ω. In FIG. 8, symbols C1 and D1 indicate positions of the centers of the sealing jaws 57 and 58 at two different moments when their centers of rotation are respectively at A1 and B1.

As the sealing jaws 57 and 58 continue to rotate from their initial positions S, they eventually reach the film path K. While their trajectories remain parallel to the film path K, their contact surfaces 57a and 58b sandwich the cylindrically formed film F therebetween from opposite directions.

At time t2 which is shortly before the sealing jaws 57 and 58 reach the film path K at time t3, the control unit 100 causes the centers of rotations A1 and B1 of the sealing jaws 57 and 58 to begin to move respectively forward and backward from their initial positions such that, at time t3, the centers of rotations of the sealing jaws 57 and 58 are at new positions A2 and B2 and the centers of the sealing jaws 57 and 58 are at Cs2 and D2s such that the film F on the film path K is sandwiched between the sealing jaws 57 an 58. The positions indicated by A2, B2, C2s and D2s are determined such that the return springs 72 are contracted as the sealing jaws 57 an 58 compress the film F therebetween and that the resultant pressure on the film will approach and equal the optimum pressure which is preliminarily inputted through a target setting means 101 (such as a keyboard) and is retrieved from the memory section 100a of the control unit 100 for the kind of film F being used.

Thereafter until time t5, the control unit 100 causes the sealing jaws 57 and 58 to move linearly downward such that the distance between the center points C and D of the sealing jaws 57 an 58 remain the same. In other words, their motion is so controlled that the contact surfaces 57a and 58a continue to apply the selected optimum pressure on the film F while the film F is transported downward along its path K.

Explained more in detail with reference to FIG. 7, the control unit 100 causes the centers of rotation A and B of the sealing jaws 57 and 58 to move respectively forward and backward according to a sine function from A2 and B2 to A3 and B3 as the arm members 28, 29, 40 and 41 rotate from time t3 until t4 when they become horizontal, and to move respectively backward and forward according to a sine function from A3 and B3 back to A2 and B2 between time t4 and time t5. As the distance between the centers of rotation A and B is thus varied, the centers C and D of the sealing jaws 57 and 58 move linearly from C2s to C3 to C2e and from D2s to D3 to D2e, respectively, such that the pressure on the film F can be maintained at the optimum value.

Since the transverse sealing of the film F is carried out while the film F is being transported on its path K, furthermore, there is no problem arising from the film F being pulled and stretched sideways.

Since the forward motion of the center of rotation A and the backward motion of the center of rotation B are started at t2 before the sealing jaws 57 and 58 come to contact the film F at time t3, the contacting of the sealing jaws 57 and 58 with the film F can be effected smoothly. In fact, unless the motor 87 is started earlier than the contact time t3, it will have to be started suddenly at t3 and the control will become difficult.

During this contact period from t3 to t5, the control unit 100 controls the rotary speed of the sealing jaws 57 and 58 such that the linear speed of the contact surfaces 57a and 58a along the film path K will be the same, as shown in FIG. 8, as the speed V of the film transportation. If the angular position of the sealing jaws 57 and 58 from their initial positions at t1 is denoted by θ, the vertical component of their velocity is given by ωcos θ. In order to make this equal to the constant linear speed V of the film F, the angular speed must be varied as a function of θ as (V/cos θ). Thus, the control unit 100 serves to rotate the sealing jaws 57 and 58 at this rate of (V/cos θ) during the contact period from t3 to t5.

After the contact period, the control unit 100 continues to move the centers of rotations A and B of the sealing jaws 57 and 58 backward and forward, respectively, until time t6. The sealing jaws 57 and 58 repeat this cycle of operation.

In summary, the driving system for effecting transverse sealing is controlled such that the motion of the support members is adjusted and the contraction of elastic members caused by contact between sealing members can be controlled. Since the distance of contraction is directly related to the sealing pressure, transverse sealing can be effected according to this invention at an optimum pressure selected for each film which is being used. Since the relationship between the contraction of the elastic members and the sealing pressure is known from the elastic constant of the elastic members, distance to be moved or the separation between the sealing members can be preliminarily calculated. Thus, there is no need to carry out any feedback operation by measuring the actual pressure between the sealing members. In other words, the transverse sealing pressure can be more easily and reliably controlled according to this invention.

What is claimed is:

1. A bag making and packaging machine for sequentially forming packaged bags from an elongated film which moves longitudinally along a specified film path, said bag making and packaging machine comprising:

a pair of transverse sealing members on opposite sides of said film path for transversely sealing said film;

a pair of support members each supporting a corresponding one of said transverse sealing members;

a force supplier for moving said support members in a mutually approaching direction perpendicular to said film path to bring said transverse sealing members towards each other to contact with said film and away to separate from each other;

at least one elastic member interposed between at least one of said support members and the corresponding transverse sealing member, said elastic member being in a contracted condition when said transverse sealing members are in contact with said film on said film path and thereby causing said transverse sealing means to apply on said film a sealing pressure corresponding to the distance of contraction by said elastic member;

target setting means for allowing a user to set a target sealing pressure; and control means for determining the distance of movement by said support members in said mutually approaching direction when said film is transversely sealed and controlling to move said driving means in said mutually approaching direction by said distance of movement such that said sealing pressure becomes equal to said target sealing pressure.

2. The bag making and packaging machine of claim 1 wherein said driving means includes rotating means for causing each of said transverse sealing members to move around on a closed path, said closed path having a parallel portion which extends parallel to and along said film path, said transverse sealing members remaining next to each other when moving on said parallel portion.

3. The bag making and packaging machine of claim 2 wherein said transverse sealing members each have a contact surface, and said control means controls said driving means such that the contact surfaces of said pair of transverse sealing members remain in a face-to-face relationship as said transverse sealing members are moving on the parallel portions of the closed paths.

4. The bag making and packaging machine of claim 1 further comprising an initial pressure setting means for setting the elastic compressing pressure by said elastic member before said transverse sealing members come into contact with said film on said film path.

5. The bag making and packaging machine of claim 2 further comprising an initial pressure setting means for setting the elastic compressing pressure by said elastic member before said transverse sealing members come into contact with said film on said film path.

6. The bag making and packaging machine of claim 3 further comprising an initial pressure setting means for setting the elastic compressing pressure by said elastic member before said transverse sealing members come into contact with said film on said film path.

7. A bag making and packaging machine for sequentially forming packaged bags from an elongated film which moves longitudinally along a specified film path, said bag making and packaging machine comprising:

a pair of transverse sealing members on opposite sides of said film path for transversely sealing said film;

a pair of support members each supporting a corresponding one of said transverse sealing members;

a force supplier for moving said support members in a mutually approaching direction perpendicular to said film path to bring said transverse sealing members towards each other to contact with said film and away to separate from each other;

at least one elastic member interposed between at least one of said support members and the corresponding transverse sealing member, said elastic member being in a contracted condition when said transverse sealing members are in contact with said film on said film path and thereby causing said transverse sealing means to apply on said film a sealing pressure corresponding to the distance of contraction by said elastic member;

target setting means for allowing a user to set a target sealing pressure; and control means for determining the minimum separation between said support members when said film is transversely sealed and controlling said driving means to move in said mutually approaching direction until said support members are separated by said minimum separation such that said sealing pressure becomes equal to said target sealing pressure.

8. The bag making and packaging machine of claim 7 wherein said driving means includes rotating means for causing each of said transverse sealing members to move around on a closed path, said closed path having a parallel portion which extends parallel to and along said film path, said transverse sealing members remaining next to each other when moving on said parallel portion.

9. The bag making and packaging machine of claim 8 wherein said transverse sealing members each have a contact surface, and said control means controls said driving means such that the contact surfaces of said pair of transverse sealing members remain in a face-to-face relationship as said transverse sealing members are moving on the parallel portions of the closed paths.

10. The bag making and packaging machine of claim 7 further comprising an initial pressure setting means for setting the elastic compressing pressure by said elastic member before said transverse sealing members come into contact with said film on said film path.

11. The bag making and packaging machine of claim 8 further comprising an initial pressure setting means for setting the elastic compressing pressure by said elastic member before said transverse sealing members come into contact with said film on said film path.

12. The bag making and packaging machine of claim 9 further comprising an initial pressure setting means for setting the elastic compressing pressure by said elastic member before said transverse sealing members come into contact with said film on said film path.

* * * * *